United States Patent Office 3,370,998
Patented Feb. 27, 1968

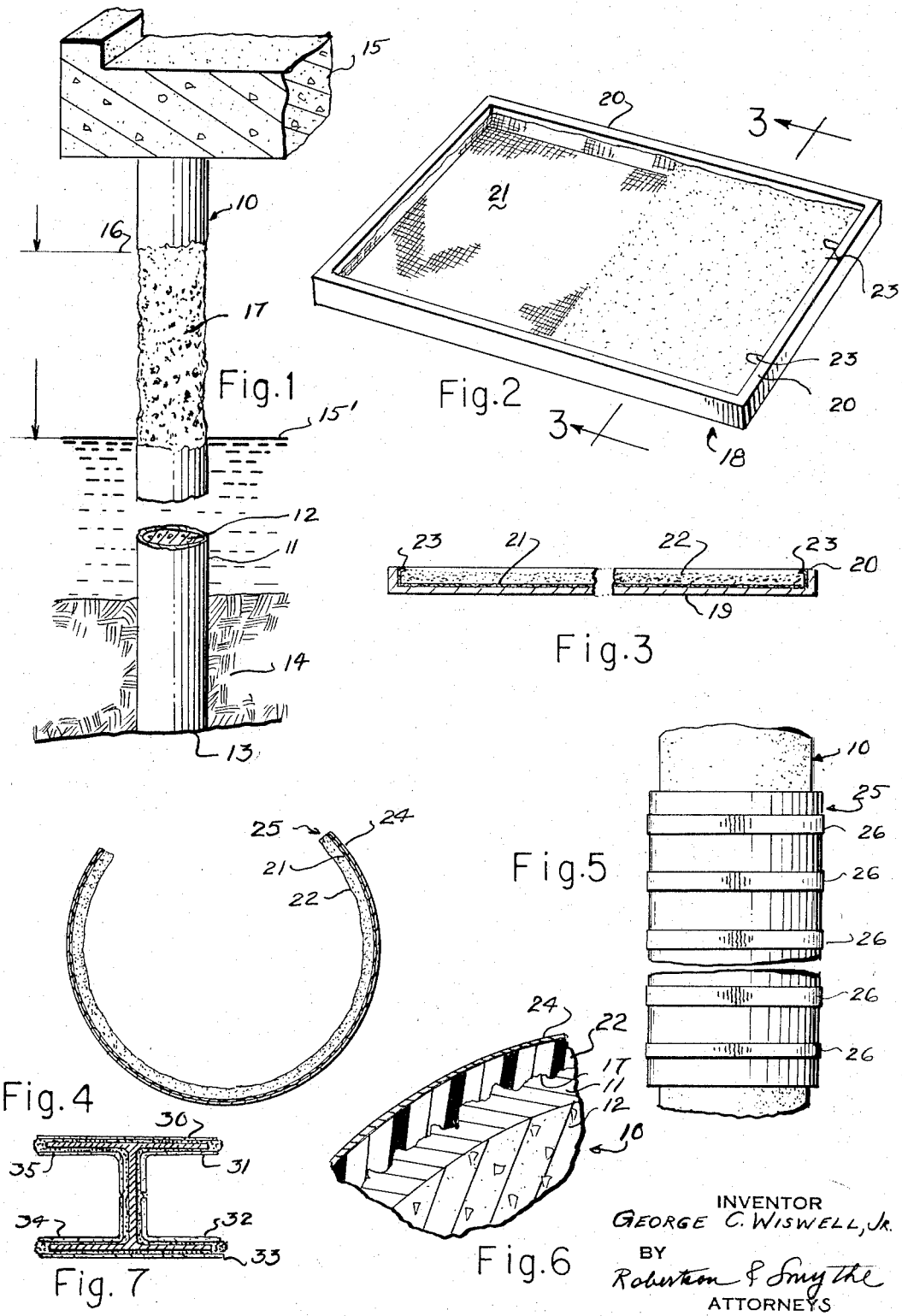

3,370,998
COATING
George C. Wiswell, Jr., 1014 Pequot Ave.,
Southport, Conn. 06490
Filed Dec. 16, 1963, Ser. No. 330,981
2 Claims. (Cl. 156—71)

ABSTRACT OF THE DISCLOSURE

A method for coating submerged pile structures to prevent corrosion by first sandblasting the corroded exterior thereof, preparing an epoxy resin sheet forming tray, and thereafter removing the resin sheet from the tray and securing it to a plate so that the sheet and plate may be applied to the pile structure, allowing the resin material to bond to the surface and harden thereon, after which the plate is removed therefrom.

---

This invention relates to a method of coating structures to prevent deterioration and particularly to coating of piles or other portions of structures which are underwater part of the time.

In the case of metal structures which are submerged all of the time, galvanic methods of protection can be effectively employed. For the portion of structures completely above water, various types of protective coatings have been used, and such can be examined and easily repaired. The difficulty arises with the portion of structures, such as piles or concrete forms, which is at the so-called "splash zone." This can be defined as the zone from a predetermined idstance below mean low water and a predetermined distance above mean high water. The action of waves and debris in the water is particularly destructive in the splash-zone of the structure and of any coating there.

As an example, a metal pile for supporting a wharf may be 90 feet long of which 60 feet is driven in the mud and 30 feet is in the water or above. It is only the 10 feet at the splash zone that deteriorates and needs repair or replacing. It should be apparent that to replace the pile, including disruption of the structure supported thereby, would be very costly.

Attempts have been made to coat piles and other types of underwater structures with resins or plastic coating materials by placing the material by hand upon the structure and then smoothing or spreading by hand the material so placed in order to cover the surface to be protected.

Such has not been satisfactory, because the material can not be placed uniformly on the surface and it may tend to sag, producing resultant irregularities in thickness. Thus, it may not have the required thickness over the entire surface so as to prevent corrosion of the object coated. Another problem encountered in prior practice has been that in very cold water difficulty has been encountered in the hand method in properly holding the material in contact with the surface for the required time for reaction of the resin and the curing agent with which it is mixed. Further, application by hand is quite inefficient because of the time needed to smooth the same over the surface and to await the reaction of the resin and curing agent.

It previously has been found that certain plastics or resins are particularly efficacious in adhering to underwater structures, these being particularly the epoxies mixed with polyamide curing agents, as will be described hereafter. As mentioned, the difficulty has been in applying these resins or plastics to the structure concerned.

One of the objects of the invention is to provide a method by which structures, underwater or otherwise, can be uniformly coated with a protective coating.

Another of the objects of the invention is to provide a method and means whereby a coating or sheet of uniform thickness can be placed on a structure.

A still further object of the invention is to provide a method of coating underwater structures efficiently with a minimum of time and cost.

In one aspect of the invention, a structure, such as a round or H-shaped pile, or other regular or irregular shaped surface, can be coated. The surface is first thoroughly cleaned, such as by sandblasting, which can be carried out underwater. The plastic or resin, preferably an epoxy resin, is mixed with a curing agent therefor for the proper length of time to provide a mixture of the proper temperature. The reaction of the epoxy and the curing agent is exothermic. Preferably, the curing agent includes polyamide, which will replace water from a surface. Such can be said to be able to "wet-out" the moist surface or to "preferentially wet" the same. One polyamide that can be used is an amine terminated polyamide.

In a preferred aspect, an arrangement is provided so that a predetermined thickness of a sheet of resin mixed with its curing agent can be achieved. This can be accomplished by use of a backing member, which is preferably porous. For example, a fiberglass screen can be used. The porous backing member can first be placed on a sheet forming tray having rims therearound of the proper height to provide the desired predetermined thickness of material. The material is spread evenly over the porous backing member and rubbed by hand so as to spread it out uniformly. The screen then can have selected zones or areas crimped over the edge of the resin sheet so that the backing member and plastic can be transferred from the sheet forming tray by picking it up therefrom and putting it on the particular form to be used for placing it on the structure itself. As an example, in the case of a round pile, the backing member and plastic sheet can be placed on a plate of relatively thin metal which has been treated so that it is partly curved. Then the edges are crimped at selected points so that the backing member and plastic sheet will not slide off the form. The crimped assembly is then taken to the structure and firmly held in place thereon during curing. In the case of the pile, it is wrapped around the same and held in place at the proper pressure by banding straps. Thus, the plastic sheet is held in intimate contact with the structure surface until it cures, the polyamide absorbing what may be called a monomolecular layer of water on the surface so as to obtain an integral bond with the metal or surface.

In the case of a flat or other irregular shaped surface, a flat or suitably shaped form means can be used and held in place by various means, such as explosive driven studs and wing nuts, clamps and other holding means. In some places, it is possible to remove the form after curing if a suitable separating means is placed thereon, such as a polyethylene sheet.

These and other objects, advantages and features of the invention will become apparent from the following drawings and description which are merely exemplary.

In the drawings:

FIG. 1 is a perspective schematic view, partially broken, showing one form of structure to which the invention can be applied;

FIG. 2 is a perspective view of a sheet forming box or tray;

FIG. 3 is a broken view taken along the line 3—3 of FIG. 2;

FIG. 4 is a view of the supporting member with the backing member and plastic sheet thereon;

FIG. 5 shows the assembly of FIG. 4 in place;

FIG. 6 is a fragmentary enlarged view showing the supporting plate and plastic sheet or coating in place and;

FIG. 7 is a section of an H-shaped pile with the coating and supporting forms thereon.

Referring to FIG. 1, pile 10 is of the conventional type having a steel or metal exterior 11 filled with concrete 12. It is driven at its lower end 13 into the mud or bottom 14. The concrete or other structure 15 rests on top of the pile in the usual manner. Water level 15′ is illustrated at its lower level which may, for example, be the mean low water. The splash zone extends from below the mean low water level to level 16 thereabove which is above the mean upper or high water level. The pile is subject to deterioration as indicated schematically at 17 in the splash zone.

The preferred coating to be employed is an epoxy resin sold under the trademark "Epon 828" made by Shell Chemical Company. It is also designated "UC 3–32545," "Splash Zone Compound," and is made by Pittsburgh Plate Glass Company. It is a liquid epoxy resin without diluent. The viscosity of one form is 10,000–20,000 centipoises at 73° F., the epoxide equivalent weight is 175–210 and the hydroxyl equivalent weight 85. It is to be understood that other suitable epoxies may be used.

The preferred curing agent is an amine terminated polyamide resin. One such is designated "UC 3–32546," and is made by Pittsburgh Plate Glass Company. Approximately an equal quantity of resin and curing agent is placed on a table and mixed together by hand for a predetermined time so as to be at the proper curing point before transfer. Preferably, each component is pigmented with a different color to assist in determining when they are completely mixed.

Sheet forming tray 18 has a bottom plate 19 (FIGS. 2, 3) with side walls 20 of a predetermined height according to the thickness desired for the resin or plastic sheet. First, a backing member 21, which preferably is porous and may be in the form of a fiberglass screen, is placed on top of plate 19. Other porous membrances such as cloth can be used. The previously mixed epoxy and polyamide resin is placed in the tray and spread out thereover, such being rubbed by hand in the process, to form plastic sheet 22. A straight edge can be passed over the rims of the side walls so as to make certain that the sheet is of substantially uniform thickness.

Portions or ears 23 can be turned over so as to form a crimp for the purpose of preventing the plastic sheet from slipping off the backing member as it is transferred to the form. In the case of a round pile, a partially rolled piece of flat metal 24 has the backing member assembly 25 placed thereon as seen in FIG. 4. The ends of the metal plate can be crimped over in selected areas matching those of the sheet and backing member or otherwise, so as to hold the assembly together as it is transported to the divers or other persons for mounting on the pile.

The zone to be covered on the pile is previously sand blasted or thoroughly cleaned for reception of the plastic sheet. The assembly 25 is wrapped around the pile as can be seen in FIG. 5 and banding straps placed therearound with conventional tools so as to hold the assembly 25 in place on the pile. Such must be carried out so as to insure that the plastic is at its proper stage of curing as it is placed on the pile.

As mentioned previously, it can be theorized that the polyamide "preferentially wets" the surface and removes the monomolecular film of water thereon so that the plastic is in intimate contact therewith and becomes integrally bonded to the surface.

FIG. 6 schematically illustrates the resin or plastic sheet 22 being integrally joined to the irregular corroded surface 17 of pile 10.

In the case of an H-pile, such as seen in FIG. 7, forms 30, 31, 32, 33, 34, 35 may be employed to hold the plastic sheet firmly in place thereon. These may be of metal, plywood, "Masonite," or other similar material. If a separating sheet, such as polyethylene, is placed thereon, it is possible, if desired, to remove the forms after the epoxy resin has become cured. The backing member of proper size with the plastic sheet is placed on each of the forms and transported to the pile or other surface.

In the case of a flat surface, studs may be driven into the structure through the form and wing nuts or other fastening means used to exert the proper pressure on the form and plastic sheet so that it will be in intimate contact with the surface.

The form with the backing member and plastic sheet thereon can be efficiently handled by divers in the water in placing the same on the structure surface. After it is fastened thereon, the divers can proceed with the next sheet and form. If above water, the same holds true. If there are holes in the structure, these can be plugged with fiberglass and epoxy before the sheet and form is placed thereon.

It should be apparent that variations may be made in details of the process and the materials used without departing from the spirit of the invention except as recited in the appended claims.

What is claimed is:
1. The method of coating submerged pile structures in water to prevent corrosion comprising the steps of sandblasting the externally corroded surface of a pile structure, preparing a sheet forming tray having sides therearound and an open top, inserting a sheet of flexible porous carrier material in said tray, mixing epoxy resin and polyamide curing agent, spreading the mixed resin and curing agent on said carrier sheet, and leveling said epoxy resin material even with the sides of said tray to a uniform thickness, crimping the edges of said carrier sheet over said epoxy resin material and allowing said epoxy resin material to partially cure to a uniform plastic consistency, releasing said carrier sheet and epoxy resin material from said tray, placing and securing said carrier sheet and epoxy resin material on a relatively thin plate, applying said combined carrier sheet, epoxy resin material and plate by wrapping the same around said pile structure, temporarily attaching said plate to said pile structure, allowing said epoxy resin material to penetrate and bond to the surface of the pile structure and to cure to a permanent hardness as a coating of a uniform thickness to resist corrosion, and then removing said plate from said cured and hardened epoxy coating on said pile structure.

2. In a method according to claim 1 wherein said carrier sheet and epoxy resin material are placed on and secured to a thin curved plate, and said combined carrier sheet, epoxy resin material and curved plate are applied by wrapping the same around said pile structure, and applying encircling means to said curved plate for attachment to said pile structure.

References Cited
UNITED STATES PATENTS

| | | | |
|---|---|---|---|
| 1,510,394 | 9/1924 | Frazier | 138—99 |
| 1,721,864 | 7/1929 | Johnson | 139—99 |
| 2,609,003 | 9/1952 | Kass | 138—99 |
| 3,149,646 | 9/1964 | Xenis | 138—97 |
| 3,193,438 | 7/1965 | Schafer | 156—184 |
| 1,959,421 | 5/1934 | Hardesty | 161—87 |
| 3,159,499 | 12/1964 | Jorda | 117—161 |
| 3,160,518 | 12/1964 | Jorda | 117—161 |

EARL M. BERGERT, *Primary Examiner.*

J. P. MELOCHE, D. J. FRITSCH, *Assistant Examiners.*